(12) United States Patent
Williamson

(10) Patent No.: US 10,721,867 B2
(45) Date of Patent: Jul. 28, 2020

(54) SHAPED CONVEYOR SYSTEM FOR A HARVESTER

(71) Applicant: A & B Packing Equipment, Inc., Lawrence, MI (US)

(72) Inventor: Robert L Williamson, Hartford, MI (US)

(73) Assignee: A & B Packing Equipment, Inc., Lawrence, MI (US)

( * ) Notice: Subject to any disclaimer, the term of this patent is extended or adjusted under 35 U.S.C. 154(b) by 0 days.

(21) Appl. No.: 16/102,869

(22) Filed: Aug. 14, 2018

(65) Prior Publication Data

US 2018/0352741 A1 Dec. 13, 2018

Related U.S. Application Data

(63) Continuation of application No. 15/334,395, filed on Oct. 26, 2016, now Pat. No. 10,045,484, which is a continuation-in-part of application No. 15/042,428, filed on Feb. 12, 2016, now Pat. No. 9,888,629.

(51) Int. Cl.
*A01D 46/28* (2006.01)
*A01D 46/26* (2006.01)
*A01D 46/00* (2006.01)

(52) U.S. Cl.
CPC ............. *A01D 46/28* (2013.01); *A01D 46/26* (2013.01)

(58) Field of Classification Search
None
See application file for complete search history.

(56) References Cited

U.S. PATENT DOCUMENTS

| | | | | |
|---|---|---|---|---|
| 3,705,486 A | * | 12/1972 | Chen | A01D 46/28 56/330 |
| 4,976,094 A | * | 12/1990 | Williamson | A01D 46/28 198/313 |
| 5,339,612 A | * | 8/1994 | Scott | A01D 46/28 56/328.1 |
| 5,642,610 A | * | 7/1997 | Dupon | A01D 46/28 56/330 |
| 7,748,205 B2 | * | 7/2010 | Amaro | A01D 46/24 56/328.1 |

* cited by examiner

*Primary Examiner* — Kavel Singh
(74) *Attorney, Agent, or Firm* — The Watson IP Group, PLC; Jovan N. Jovanovic

(57) ABSTRACT

A shaped conveyor assembly configured for use in association with a harvester comprising a first side lower conveyor sub-assembly and a second lower conveyor subassembly. One or both of the sub-assemblies having a frame structure, a discharge assembly and a conveyor assembly. The frame structure has a gathering portion, an outward portion and a terminating portion. The gathering portion is positioned proximate the first end and spaced apart from the second end. The terminating portion is positioned proximate the second end and spaced apart from the first end. The outward portion extends therebetween, the outward portion being inclined in an upward direction relative to the gathering portion, and directed in an outward direction, thereby extending away from the channel, and away from the other one of the first side and the second side lower conveyor sub-assemblies.

22 Claims, 15 Drawing Sheets

SHAPED CONVEYOR SYSTEM FOR A HARVESTER

CROSS-REFERENCE TO RELATED APPLICATION

The present application is a continuation of U.S. patent application Ser. No. 15/334,395 filed Oct. 26, 2016, entitled Shaped Conveyor System For A Harvester, which is a continuation-in-part of U.S. patent application Ser. No. 15/042,428 filed Feb. 12, 2016, entitled "Harvester," the entire specification of which is incorporated by reference herein in its entirety.

BACKGROUND OF THE DISCLOSURE

1. Field of the Disclosure

The disclosure relates in general to a harvester, and more particularly, to a shaped conveyor system for a harvester that is particularly useful for picking of blueberries and the like. The conveyor and the harvester with which it is utilized is not limited to use in association with the picking of blueberries, or any fruit in particular, and the use in association with the picking of blueberries should be deemed exemplary and not limiting the use thereto.

2. Background Art

The harvesting of blueberries is well known in the art. Typically, mechanized equipment in the form of a blueberry harvester proceeds from blueberry plant to blueberry plant dislodging the blueberries onto conveyors which can then collect the blueberries and discharge them into baskets, boxes or the like. Mechanization has greatly increased the speed at which blueberries can be harvested and has also greatly reduced the labor required.

While advances have been made, there have been problems with such equipment. For example, such equipment may be well suited for picking blueberries that will be sold as frozen product. However, such equipment is typically not well suited for picking blueberries for packaging as fresh in retail packaging. Generally, the currently available mechanized equipment tends to damage a large portion of the blueberries during picking, and such damaged blueberries are typically not sellable as fresh in retail packaging. Thus, even where mechanization is utilized, hand picking continues to be the manner in which blueberries are harvested for packaging as fresh in retail packaging, as current picking equipment cannot achieve consistent product that is free of excessive damage, such as bruises, cuts, scuffs, and breaks, among other deformities.

One such advancement is shown in co-pending application cited above, namely, U.S. patent application Ser. No. 15/042,428. It is further desirable to have less impact on the plants as the plants exit from the harvester. For example, while it is desirable to raise the level of the conveyors utilized to transport the berries upwardly so as to be able to easily discharge into a container (for example, a container that is positioned on the harvester), such conveyors can interfere with and damage the plants that have been processed through the harvester.

SUMMARY OF THE DISCLOSURE

The disclosure is directed a shaped conveyor assembly configured for use in association with a harvester comprising a first side lower conveyor sub-assembly and a second side lower conveyor sub-assembly. The first side and second side lower conveyor assemblies being spaced apart from each other and on opposing sides of a channel through which plants to be processed by the harvester extend. At least one of the first side and second side lower conveyor sub-assemblies including a frame structure, a discharge assembly and a conveyor assembly. The frame structure having a first end and a second end extending longitudinally along the length of the harvester. The frame structure including a gathering portion, an outward portion and a terminating portion. The gathering portion is positioned proximate the first end and spaced apart from the second end. The terminating portion is positioned proximate the second end and spaced apart from the first end, with the outward portion extending therebetween. The outward portion is inclined in an upward direction relative to the gathering portion, and directed in an outward direction, thereby extending away from the channel, and away from the other one of the first side and the second side lower conveyor sub-assemblies. The discharge assembly is positioned at the second end of the frame structure. The discharge assembly is structurally configured to dispense into a container. The conveyor assembly extends between the first end and the second end, and along each of the gathering portion, the outward portion and the terminating portion.

In some configurations, the outward portion comprises an outwardly curved portion.

In some configurations, a portion of the terminating portion is substantially parallel to at least a portion of the gathering portion.

In some configurations, the outward portion is angled relative to the gathering portion by an angle of between 110° and 170°. In other configurations, the outward portion is angled relative to the gathering portion by an angle of between 145° and 160°.

In some configurations, the terminating portion comprises an inwardly curved portion. The curves substantially match resulting in a portion of the terminating portion being substantially parallel to at least a portion of the gathering portion.

In some configurations, the first side lower conveyor sub-assembly and the second side lower conveyor sub-assembly are substantial mirror images of each other taken generally about a longitudinal axis bisecting the channel.

In some configurations, the frame structure defines a lower chamber and an upper open chamber between the first end and the second end thereof. The conveyor passes through the lower chamber in a first direction and through the upper open chamber in a second direction.

In some configurations, the conveyor assembly comprises a plurality of cup members arranged in an end to end fashion. The cup members are configured to rotate relative to each other about an axis and to pivot relative to each other about a plane perpendicular to the axis.

In some configurations, the cup members are joined to each other through a plurality of axles that extend through adjacent pairs of cup members.

In some configurations, the cup members include opposing pairs of openings and slots, with the openings substantially corresponding to the axles, and with the slots allowing for slidable movement of the axles therealong.

In some configurations, the shaped conveyor assembly further includes a plurality of guide wheel, each one of which is coupled to opposing ends of each one of the plurality of axles.

In some configurations, the shaped conveyor assembly further includes a guide link extending between adjacent ones of the plurality of axles outboard each of the plurality of guide wheels.

In some configurations, the frame structure further includes an upper open channel, defined by an outer upstand wall and an inner upstand wall opposite the outer upstand wall, and an intermediate wall, and a lower chamber below the upper open channel. The outer upstand wall has an inwardly facing outer wall channel. The inner upstand wall has an inwardly facing inner wall channel. One of the axles and the guide wheels structurally configured to interface with the wall channels, to, in turn, facilitate placement of the conveyor relative to the frame structure.

In some configurations, each cup member further includes a base surface, a first side wall, a second side wall, a back wall and a front wall, each extending upwardly from the base surface to define a cavity with an upper opening. One of the front and back walls further including an upper cover flange extending therefrom, and structurally configured to overlie the back wall of an adjacent cup member when joined.

In some configurations, each of the first side wall and the second side wall include an axle slot and an axle opening. The axle slots of the first side wall and the second side wall corresponding to each other, and with the first slot and the second slot corresponding to each other.

In some configurations, the discharge assembly further includes a berry discharge guide member having a plurality of openings, and a blower outlet directed to the plurality of openings to, in turn, facilitate the blowing of air through the openings.

In some configurations, a berry discharge chute extends from the berry discharge chute.

In some configurations, the shaped conveyor assembly further comprises an air duct positioned above the berry discharge guide member, and including an outlet spaced apart from the berry discharge chute.

In some configurations, the gathering portion further includes a plurality of openings positioned therealong. A cover portion is selectively positionable between one of an open configuration and a closed configuration. In the closed configuration, access to the openings is precluded.

In some configurations, the cover portion is hingedly coupled to the gathering portion of the frame structure.

BRIEF DESCRIPTION OF THE DRAWINGS

The disclosure will now be described with reference to the drawings wherein.

DETAILED DESCRIPTION OF THE DISCLOSURE

Figure 1A:
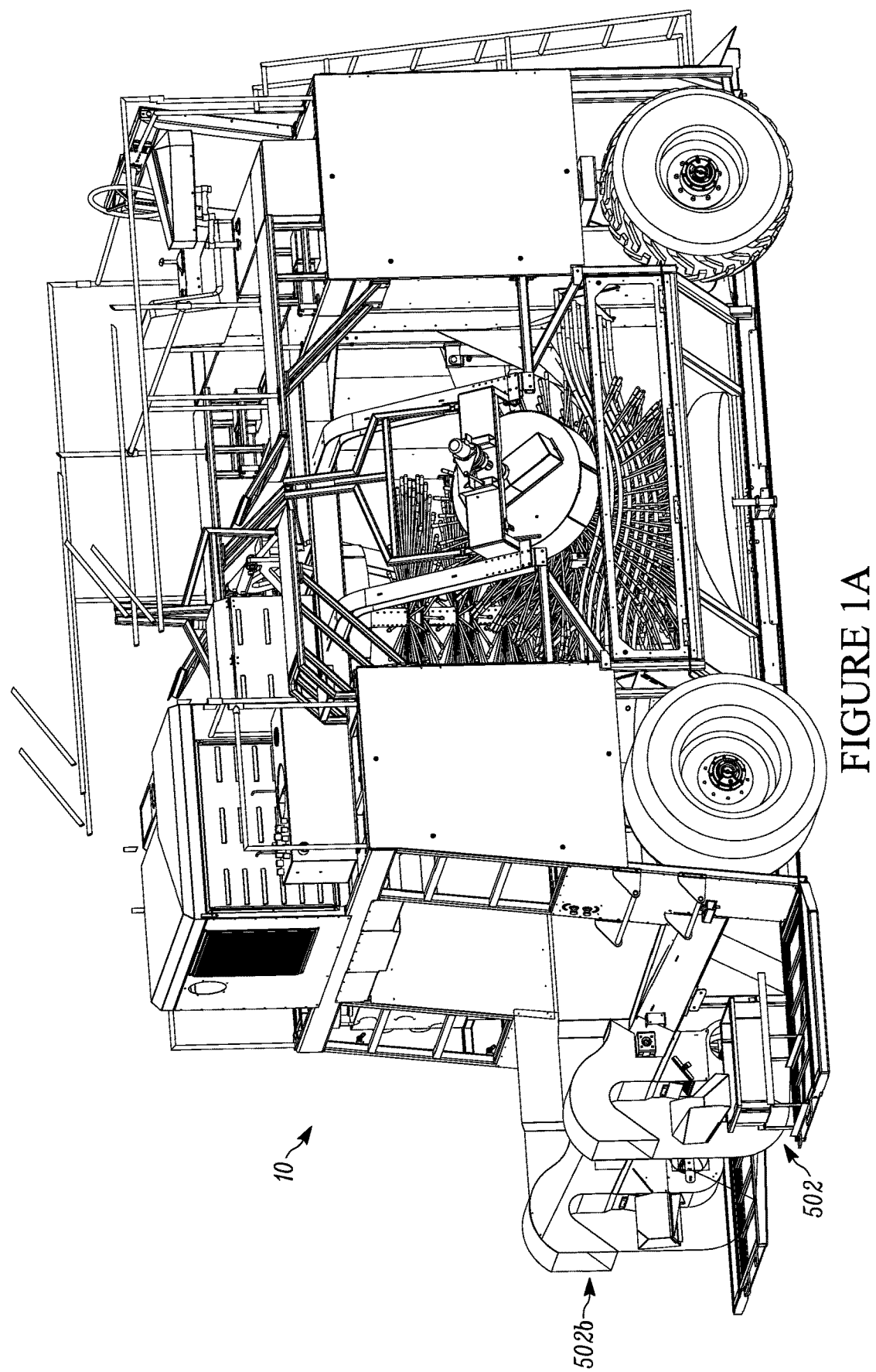
FIG. 1A of the drawings is a perspective view of a harvester having the shaped conveyor assembly of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
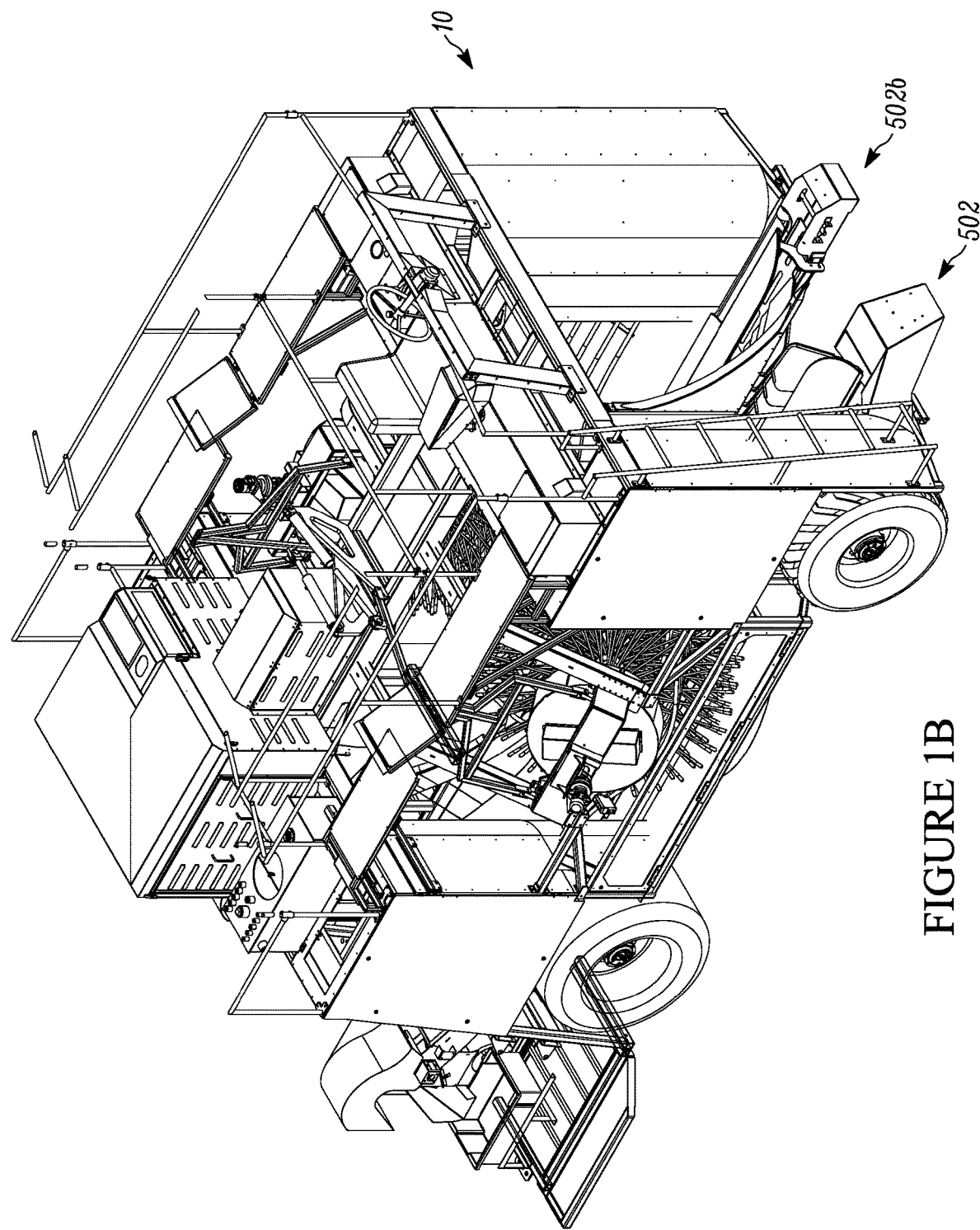
FIG. 1B of the drawings is a perspective view of a harvester having the shaped conveyor assembly of the present disclosure.
Figure 2:
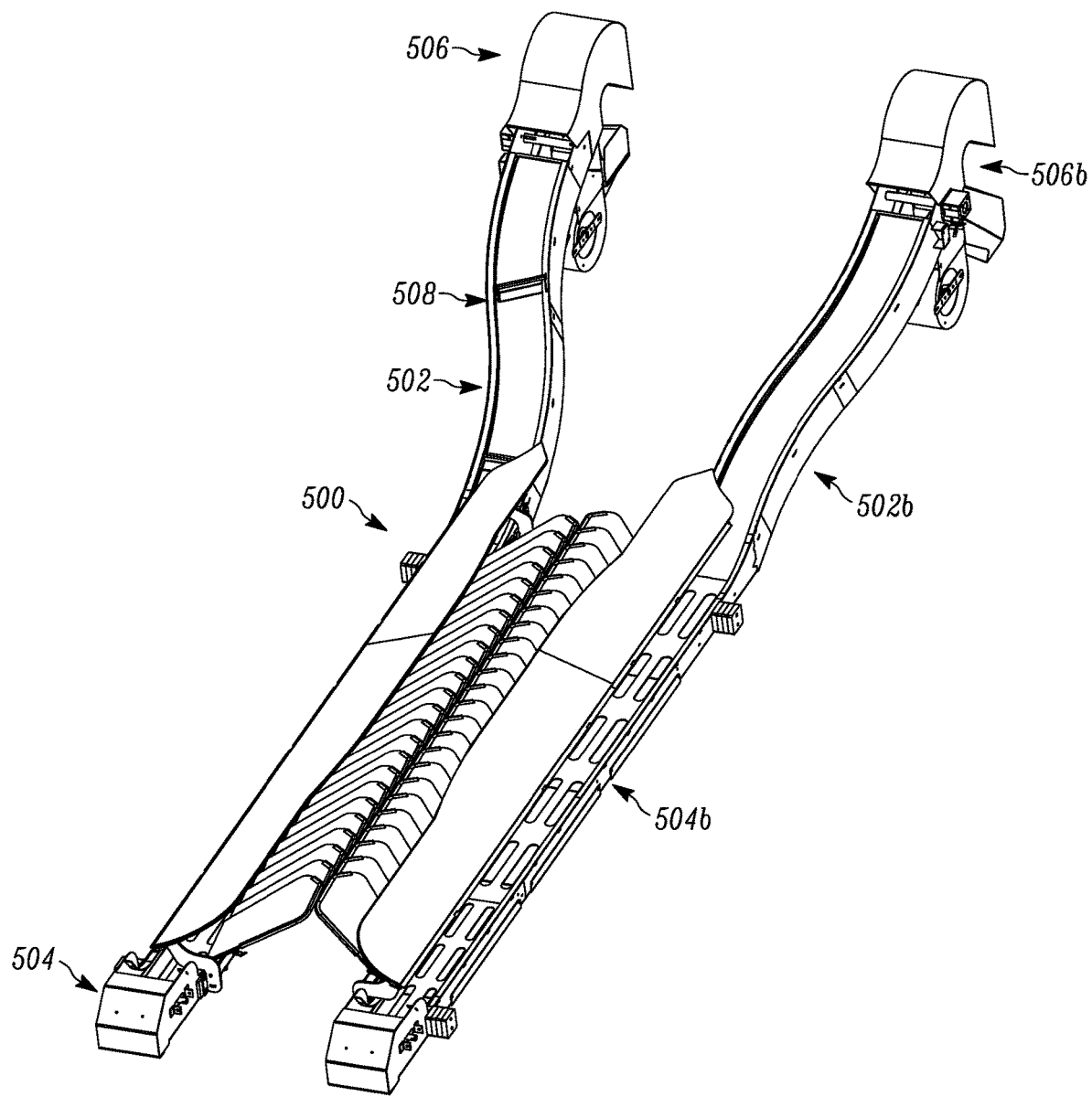
FIG. 2 of the drawings is a perspective view of the shaped conveyor assembly of the present disclosure, showing the first side and the second side lower conveyor sub-assemblies.
Figure 3:
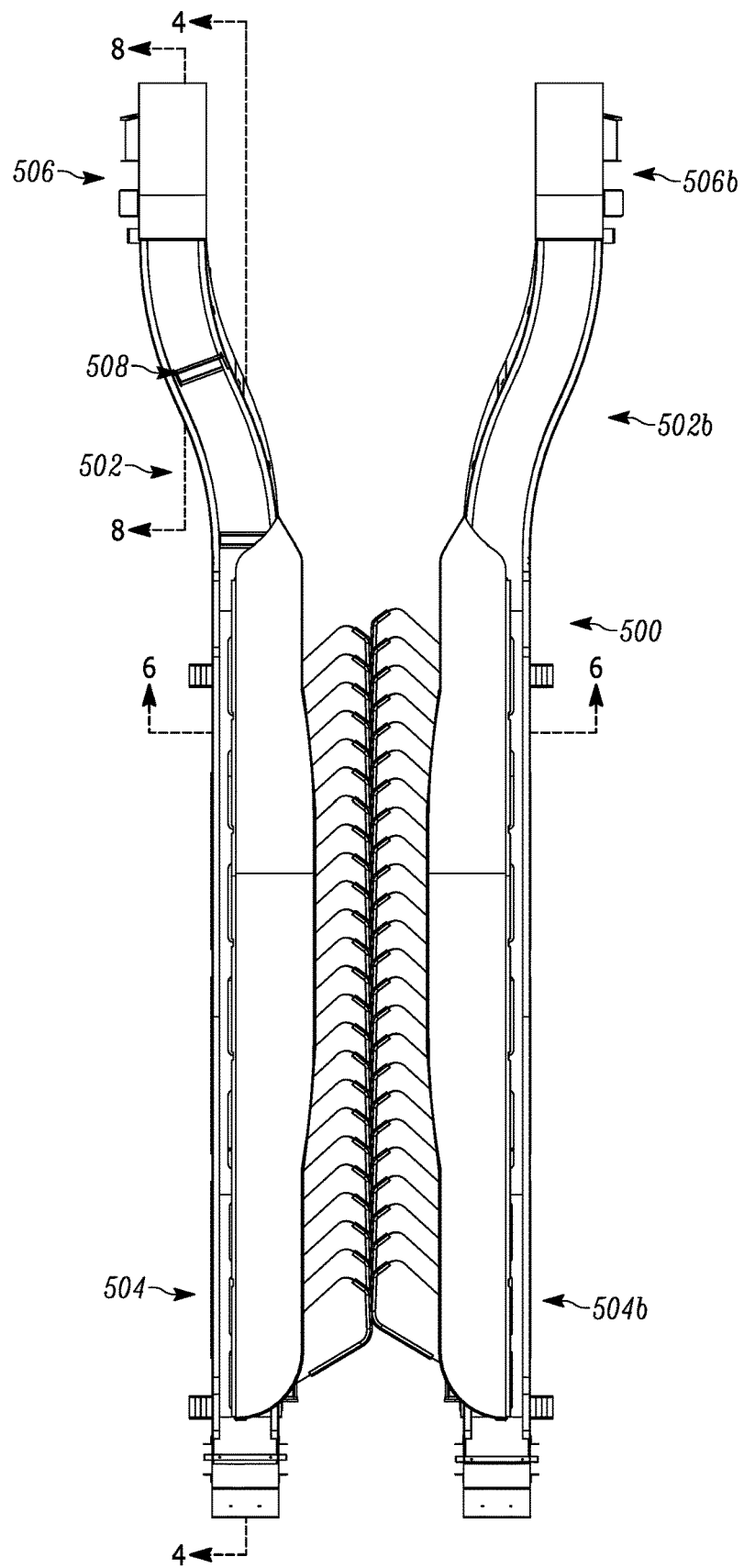
FIG. 3 of the drawings is a top plan view of the shaped conveyor assembly of the present disclosure, showing the first side and the second side lower conveyor sub-assemblies.
Figure 4:
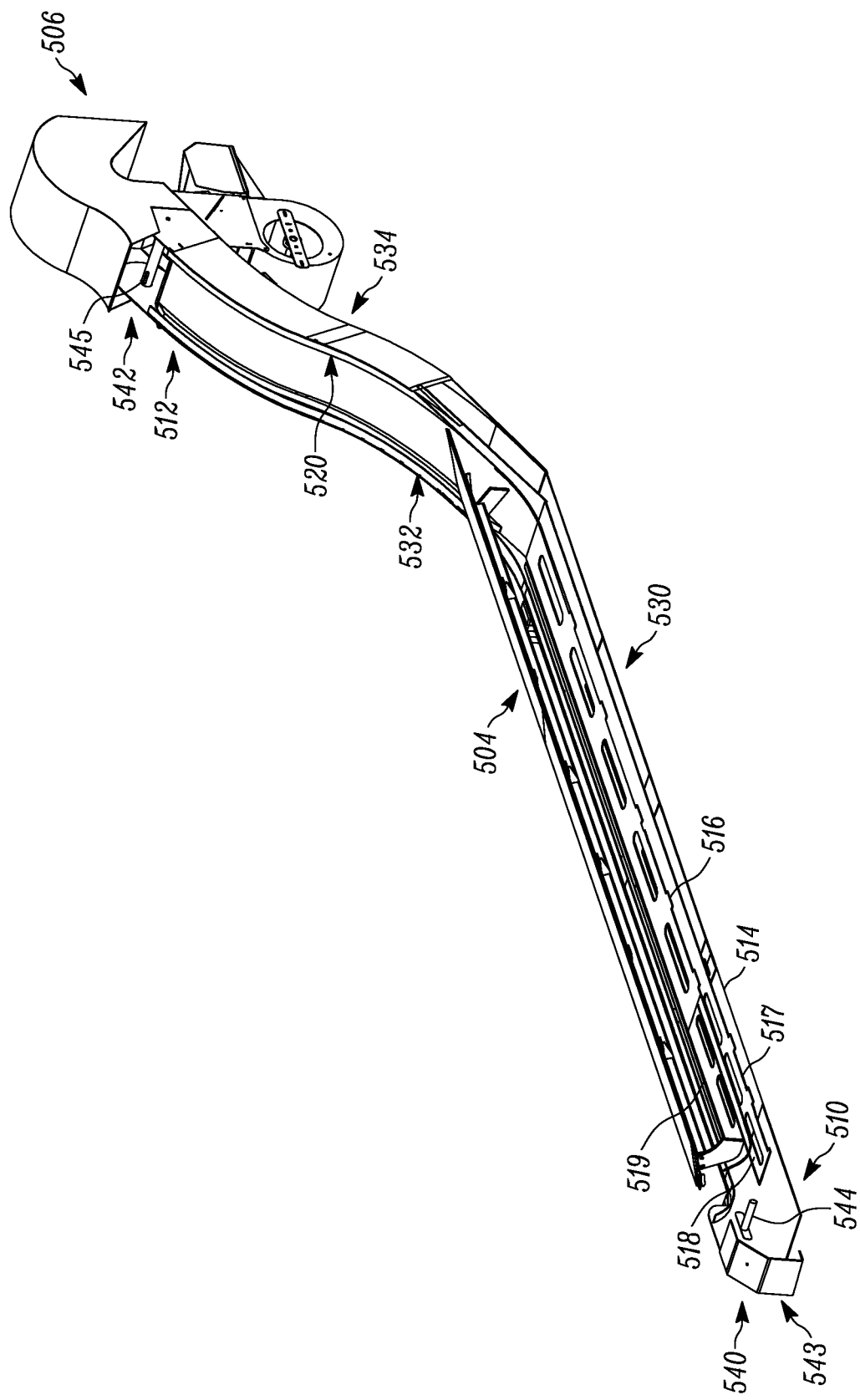
FIG. 4 of the drawings is a partial cross-sectional view of the first side lower conveyor sub-assembly, taken generally about lines 4-4 of FIG. 3, and, showing, in particular, the frame structure.
Figure 5:
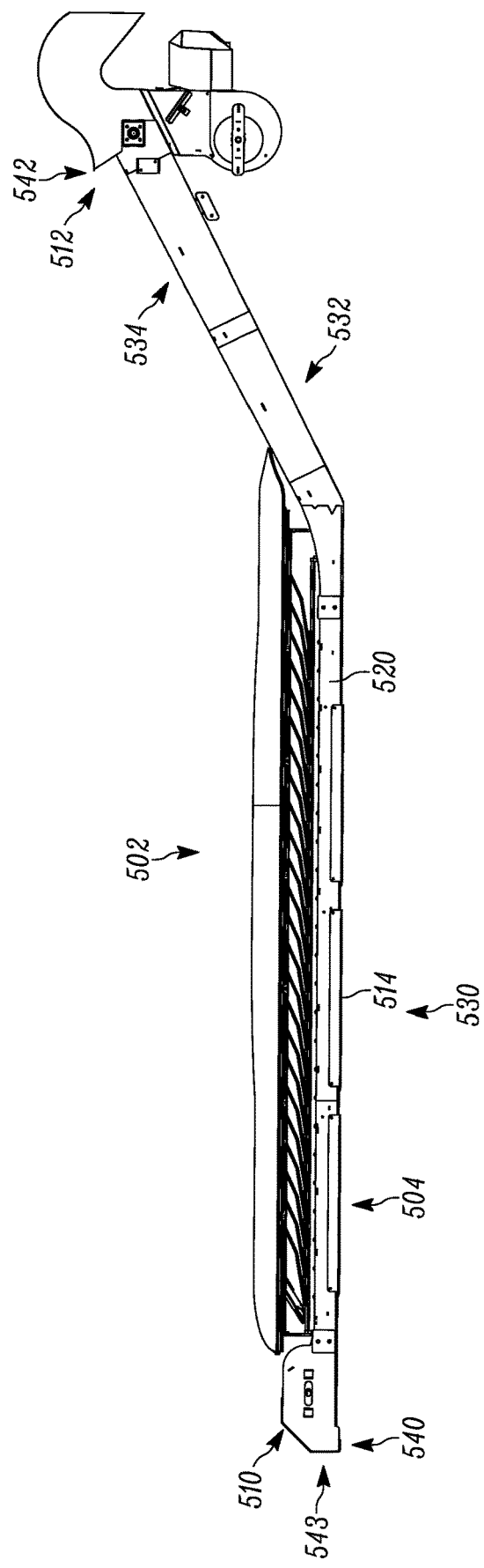
FIG. 5 of the drawings is a side elevational view of the first side lower conveyor sub-assembly, showing, in particular, the frame structure.
Figure 6:
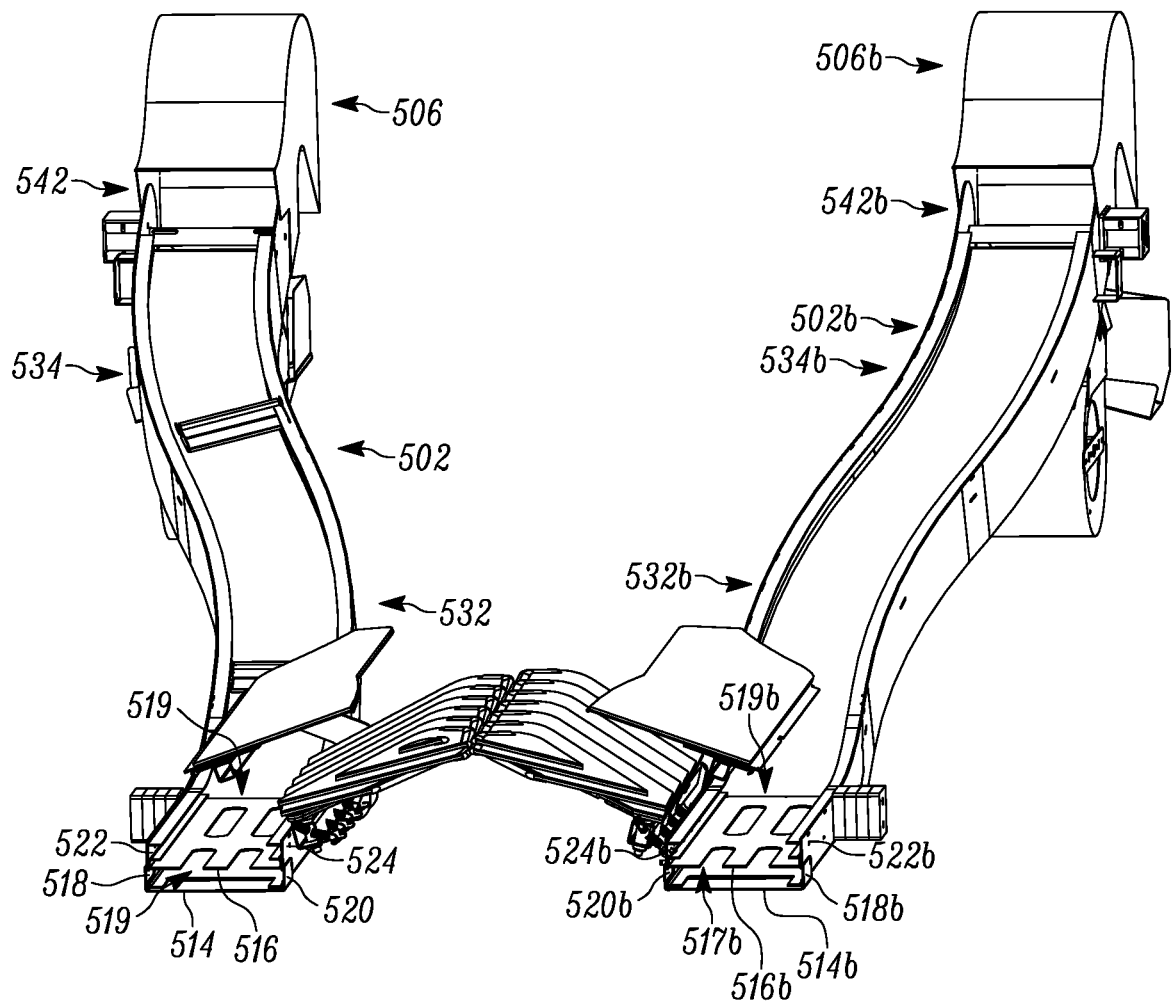
FIG. 6 of the drawings is a cross-sectional view of the shaped conveyor assembly of the present disclosure, taken generally about lines 6-6 of FIG. 3.

Referring now to the drawings and in particular to FIG. 1, the shaped conveyor assembly is shown generally at 500. The shaped conveyor is utilized in association with the harvester 10, of FIGS. 1A and 1B, which is similar in function and structure to that is disclosed and claimed in co-pending U.S. patent application Ser. No. 15/042,428 filed Feb. 12, 2016, entitled "Harvester," but which includes the shaped gathering system. The entire disclosure of the '428 application is incorporated by reference herein in its entirety.

As is shown in FIGS. 1A, 1B, 2 and 3, the shaped conveyor assembly includes first side lower conveyor sub-assembly 502 and the second side lower conveyor sub-assembly 502b. The two lower conveyor sub-assemblies are spaced apart from each other and on opposing sides of a channel through which the plants to be processed by the harvester extend. Such a configuration is shown in FIGS. 1A and 1B.

It will be understood that the first and second side lower conveyor subassemblies 502, 502b are substantially identical mirror images of each other, while variations are contemplated between the two structures. As such, the first side lower conveyor sub-assembly will be described with the understanding that the second side lower conveyor subassembly 502b is substantially the same. It will also be understood that where like structures are shown in the figures, the same reference number augmented by a "b" will be utilized in the drawings.

With further reference to FIGS. 4 through 8, the first side lower conveyor sub-assembly includes frame structure 504, discharge assembly 506 and conveyor assembly 508. The frame structure extends from the front to the back of the harvester, and on one side thereof. The frame structure 504 includes a first end 510 and a second end 512. The structure of the frame includes a base surface 514, intermediate surface 516, both of which span between outer upstand wall 518 and inner upstand wall 520. These structures essentially run the length of the frame structure between the first and second ends. The structures define a lower chamber 517 and upper open channel 519. It will be understood that the lower chamber is configured to have the return portion of the belt, and that the upper chamber is configured to have the surface upon which the conveyor itself is positioned upon (although it will be understood that the actual conveyor may or may not rest on this surface). As such, the conveyor travels in opposite directions in the lower chamber and the upper open channel.

Opposing wall channels are disposed on each of the inner and outer upstand walls above the intermediate surface 516. In particular, the outer wall channel 522 includes upper flange 525 and lower flange 526. The inner wall channel 524 includes upper flange 527 and lower flange 528. The channels inwardly face each other on opposing upstand walls.

Figure 7:
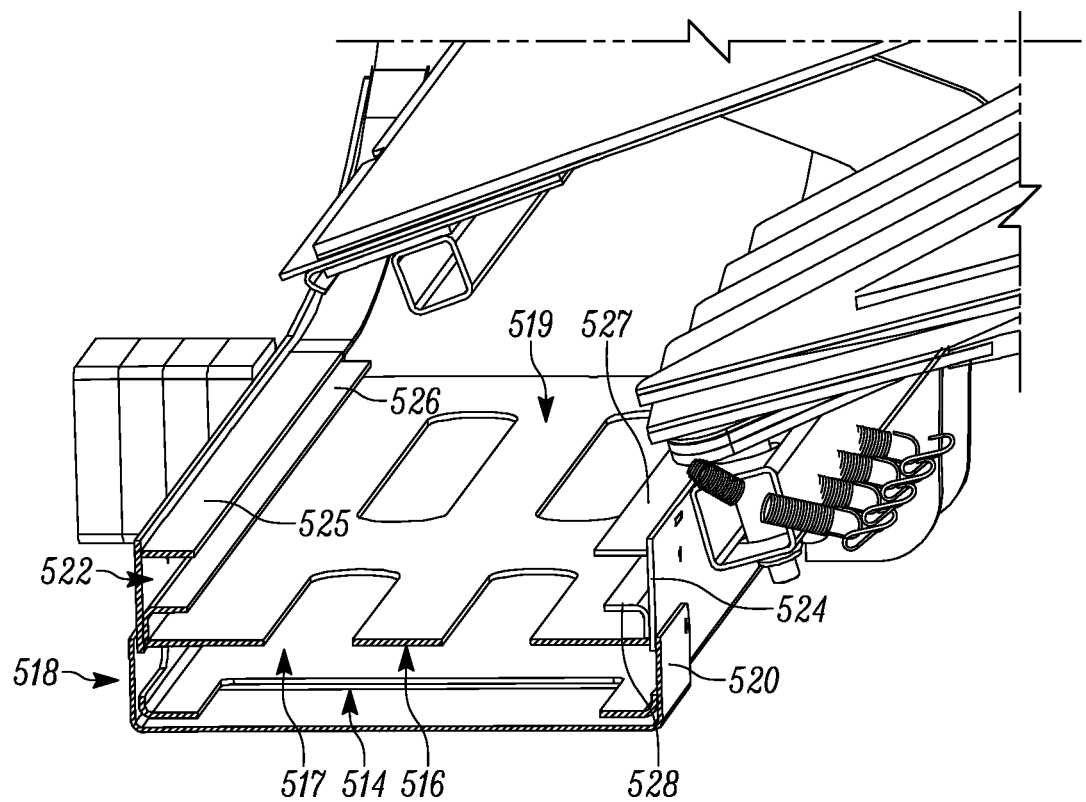
FIG. 7 of the drawings is a partial cross-sectional view of the first side lower conveyor subassembly, taken generally about lines 6-6 of FIG. 3, and, showing, in particular, the frame structure.
Figure 7A:
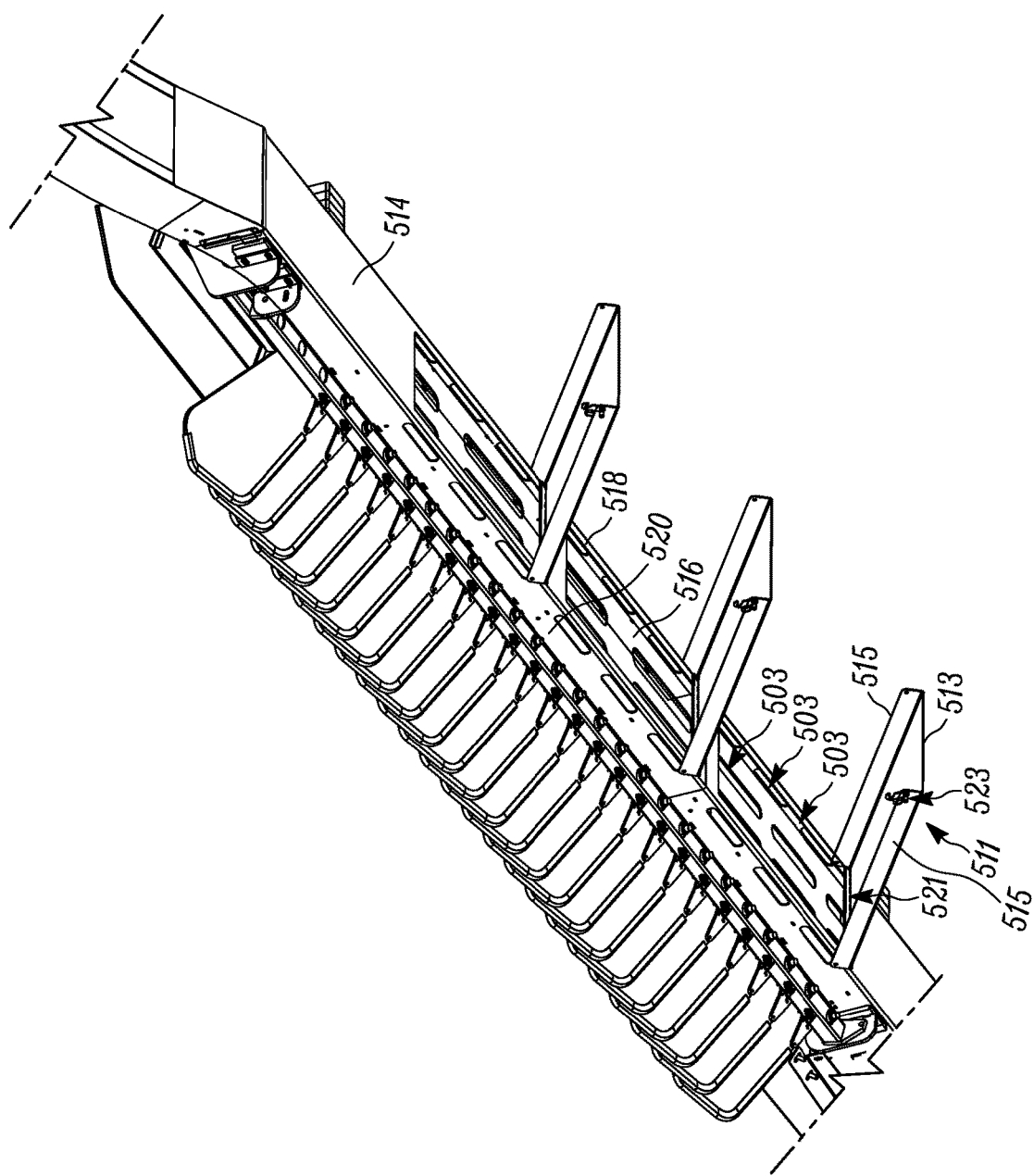
FIG. 7A of the drawings is a partial perspective view of the frame structure, showing, in particular, the cleaning openings, as well as each of the cover portions in the open position, whereas the remaining figures show each of the cover portions in the closed position.

With reference to FIG. 7A, the base surface 514, intermediate surface 516, inner upstand wall 518 and outer upstand wall 520 may further include openings extending therethrough. The openings, in the configuration shown, comprise elongated openings along the opposing upstand walls and as a rectangular relatively larger opening on the base surface. The openings of the intermediate surface place the lower chamber and the upper open chamber in fluid communication with each other. The openings of the base surface and the upstand walls provide access to the lower chamber from outside of the frame structure. The openings can be utilized as drains for fluid and debris that may fall between the conveyor and into the frame structure. Additionally, these may also be access openings for the receipt of fluids from, for example a hose or other water source. The particular size, shape and position of the openings can be varied depending on the different configurations desired.

In the configuration shown, the openings in the base surface and the upstand walls may be covered with cover portion 511. Cover portion 511 includes base 513 and opposing sides 515. The cover portion 511 is hinged at one end by hinge member 521. The cover portion is configured to overlie a portion of the base surface, the inner upstand wall and the outer upstand wall so as to cover some of the openings. As can be seen in the FIG. 7A, multiple openings may be presented on the base surface and the opposing upstand walls which can be covered by a single cover portion. It will further be understood that multiple cover portions may be utilized along the frame structure, with each such cover portion being substantially the same size and configuration (although it is contemplated that each cover may be of a different configuration).

In operation, the user can insure that the conveyor is lifted from the ground sufficient to allow for the moving of the cover portion from a position wherein the cover portion closes the openings to a position wherein the cover portion exposes the openings. In turn, as the user rotates the cover about the hinge, the cover portion can be directed between those two positions. For example, the user can move one or more of the cover portions to an open position and then spray water, for example, under pressure, through the openings to dislodge and remove dirt and debris. The openings then allow for such dislodged dirt and debris to be drained from the frame structure. When sufficiently cleaned, the user can move the cover portions back to the closed position. A latch or the like, such as latch 523 may be utilized to maintain the cover portions in the closed orientation.

The conveyor frame portion is divided between three different portions, a gathering portion 530, an outward portion 532, and a terminating portion 534. The gathering portion 530 is generally parallel to the direction of travel of the harvester or slightly oblique thereto. The outward portion 532 is curved outwardly so as to increase the space between the opposing first and second side lower conveyor sub-assemblies, to, in turn, create a greater space therebetween. The terminating portion 534 is curved in the opposite direction so as to straighten the frame structure so that, at the end of the terminating portion, the frame structures are again essentially parallel to each other in a spacing that is greater than the spacing of the gathering portion. It will further be understood that most, if not substantially all, if not all of the berry gathering actually occurs, or is preferred to occur within the gathering portion, and the gathering portion is substantially parallel to the outside surface upon which the harvester travels. The frame structure and, in turn, the conveyor is inclined in the outward portion and the terminating portion in the upward direction. In the configuration shown, the two portions are inclined relative to the gathering portion at an angle of between 110° and 170° and more preferably between 145° and 160° and more preferably at 152°. It is contemplated that in other configurations, the gathering portion and the outward and the terminating portions may be substantially flat, at 180° relative to each other. In still other configurations, the inclination of the terminating portion may be different than the outward portion, and in still other configurations, the inclination may be changing along the length of any one of the sections (i.e., all three portions may be inclined, for example, or regions of each or some of the portions).

Advantageously, during the gathering, the conveyor frame structure is positioned below the plant so that the berries (or other fruit, nut or other material) has only a short distance to fall. As the plant reaches the end of separation, it is desirable to raise the conveyor so that the conveyor can, ultimately, dispense into baskets positioned at the second end (and above the initial position of the conveyor. It is for this reason, the conveyor frame structure has been reconfigured so as to be able to be both inclined and moved outwardly, and at the same time, so as to be raised, while being moved outwardly away from the plant itself. In other words, the two conveyors are positioned on opposing sides of the channel through which plants to be processed by the harvester are directed. At the outward portion, the frame structure extends outwardly (in addition to being upwardly inclined relative to the gathering portion) so as to be further from the channel than the gathering area, and further from the opposing side lower conveyor sub-assembly.

Figure 7B:
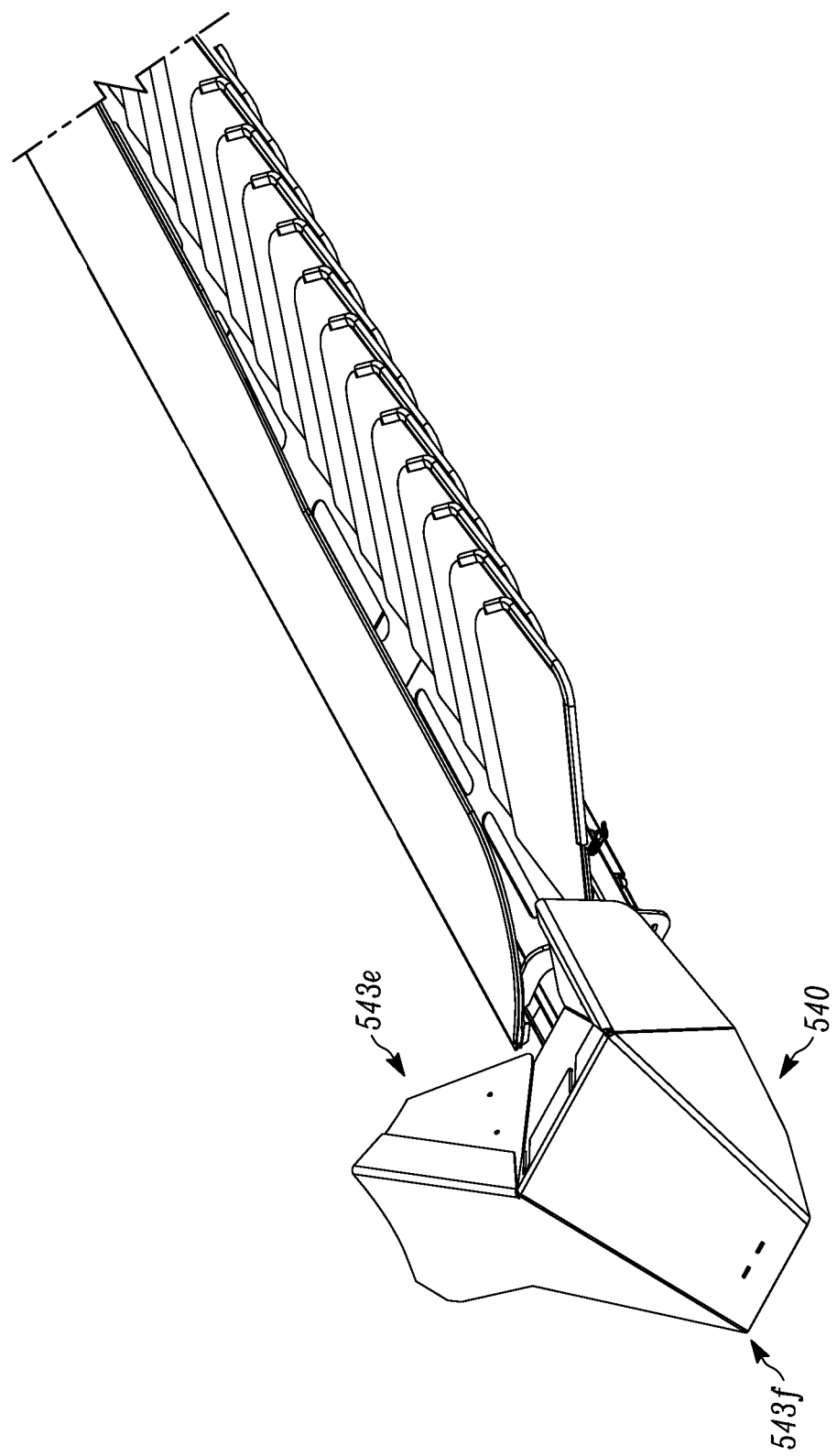
FIG. 7B of the drawings is a partial perspective view of the frame structure showing the cover of the front end portion in a closed configuration.
Figure 7C:
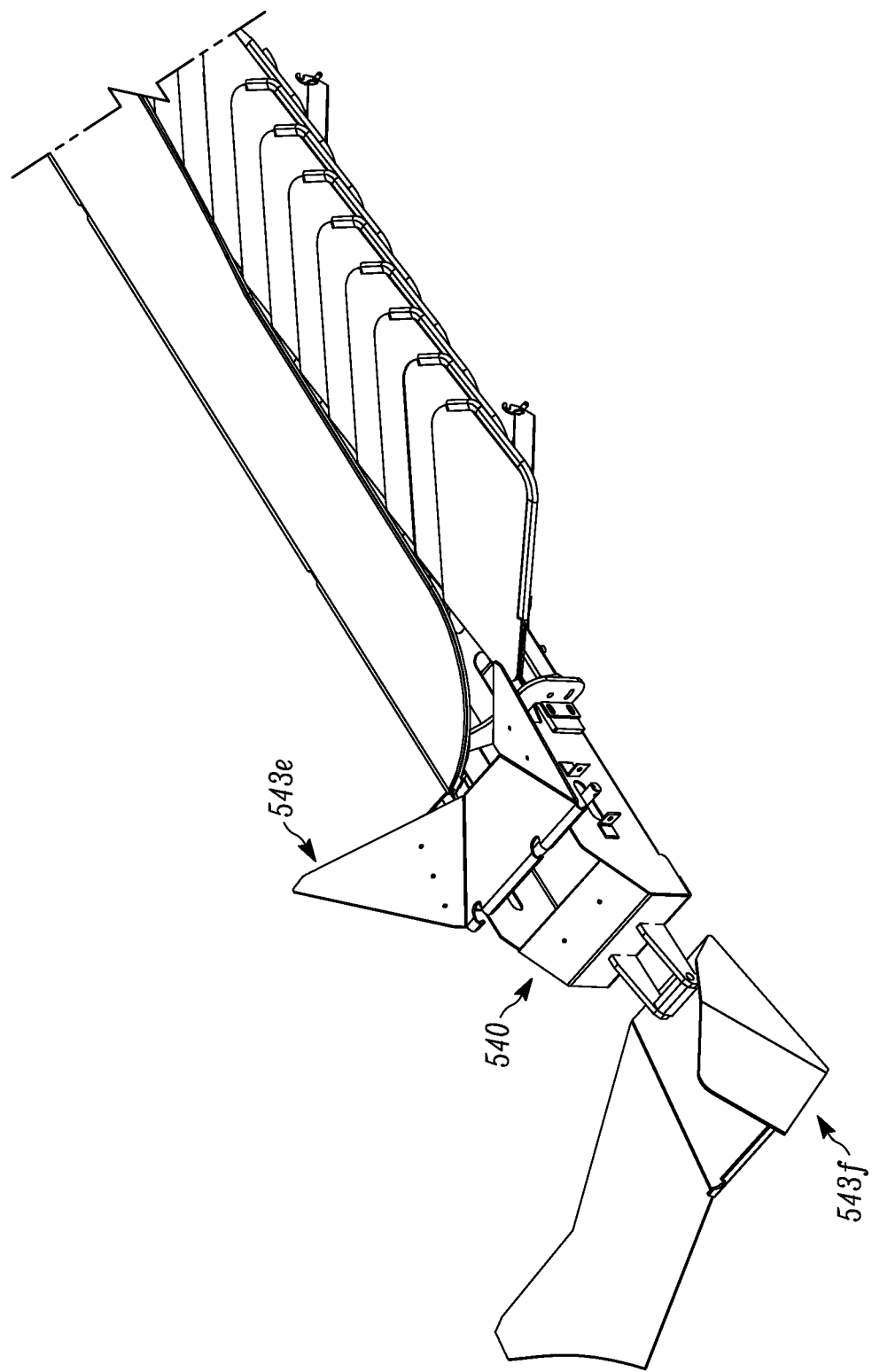
FIG. 7C of the drawings is a partial perspective view of the frame structure showing the cover of the front end portion in an open configuration, permitting cleaning.

The frame structure 504 further includes front end portion 540 and discharge end portion 542. The front end portion includes cover 543 and front pulley member 544 (which is configured to rotate with the conveyor). In the configuration shown in FIGS. 7B and 7C, the front end portion 540 further includes front door 543f and back door 543r which are hingedly coupled to the frame. The front and back doors can be pivoted so as to allow access to the front pulley member, and to clean out the region therearound. In the configuration shown, the front door rotates forward to expose the underlying structures. The front door is inclined upwardly so as to direct the plant away from this portion, and to preclude the binding of outside material thereto. The back door is likewise inclined so as to protect the structure and the underlying frame portion at the front thereof. The discharge end 542 includes back pulley member 545. A motor can be coupled to the back pulley member so as to drive the conveyor between the back pulley member and the front pulley member. Of course, in other configurations, another pulley or mechanizing structure can be employed, or the front pulley member may be powered. Variations to the powering of the conveyor is contemplated.

Figure 8:
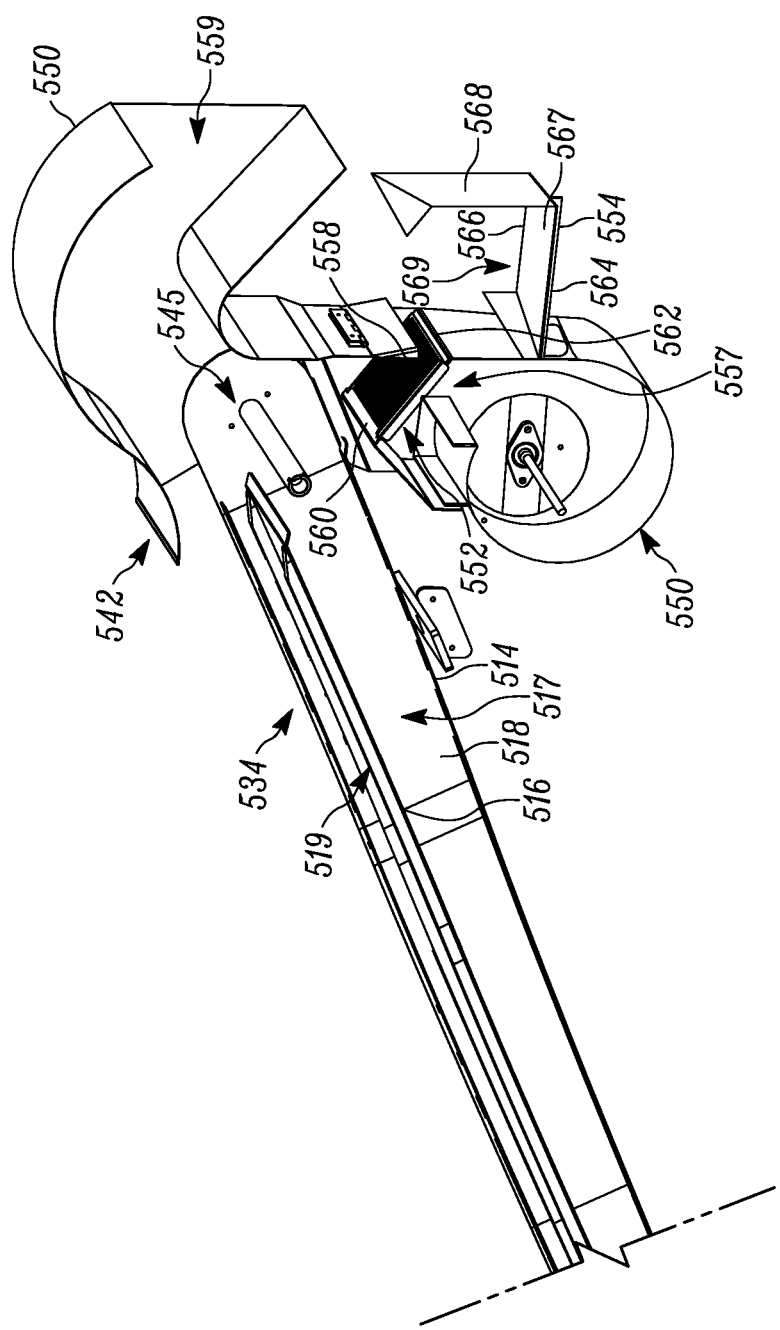
FIG. 8 of the drawings is a partial cross-sectional view of the first side lower conveyor subassembly, taken generally about lines 8-8 of FIG. 3, and, showing, in particular, the discharge assembly.

The discharge assembly 506 is shown in FIG. 8 as comprising blower cavity 550, berry discharge guide member 552, berry discharge guide chute 554 and air duct 556. The blower cavity includes outlet 557 which is configured to direct air from the centrifugal fan (not shown) and through the berry discharge guide member. The berry guide discharge member 552 includes upper end 560, lower end 561 and defines upper surface 562. The upper surface includes a plurality of openings 558 (i.e., in the configuration, a plurality of elongated slot-like openings). The berry guide discharge member directs the relatively heavier berries or other material to be picked along the upper surface, while allowing the blower lighter items (such as branches and leaves) upwardly.

The berry discharge chute 554 includes upper end 564, lower end 566, base surface 567 and opposing walls, such as opposing wall 568. The base surface and the opposing walls define channel 569. The berry discharge chute is positioned at the lower end 561 of the berry discharge guide member 552 to direct the berries to an outside container, such as a basket or the like. It will be understood that the outside structure can be another conveyor to an outside vehicle or other remote container structure.

The air duct 556 extends above the berry discharge guide member 552, and directs air (as well as debris) out through the outlet 559. In some configurations, the outlet 559, such as in the configuration shown, extends in the direction opposite to that of the travel of the vehicle, generally spaced apart from, and orthogonal to, the berry discharge chute. In still other configurations.

Figure 9:
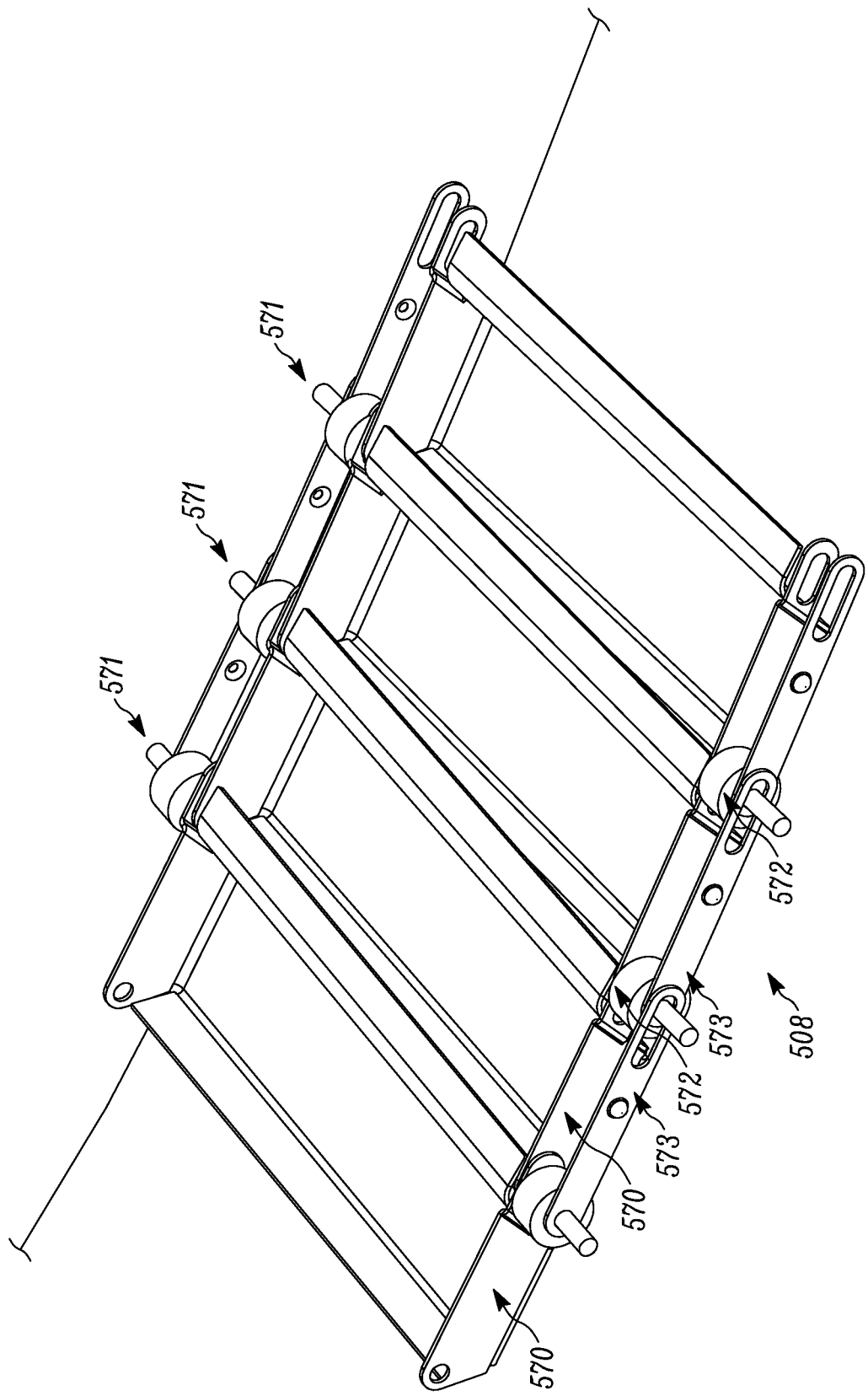
FIG. 9 of the drawings is a perspective view of a portion of the conveyor assembly of the present disclosure.
Figure 10:
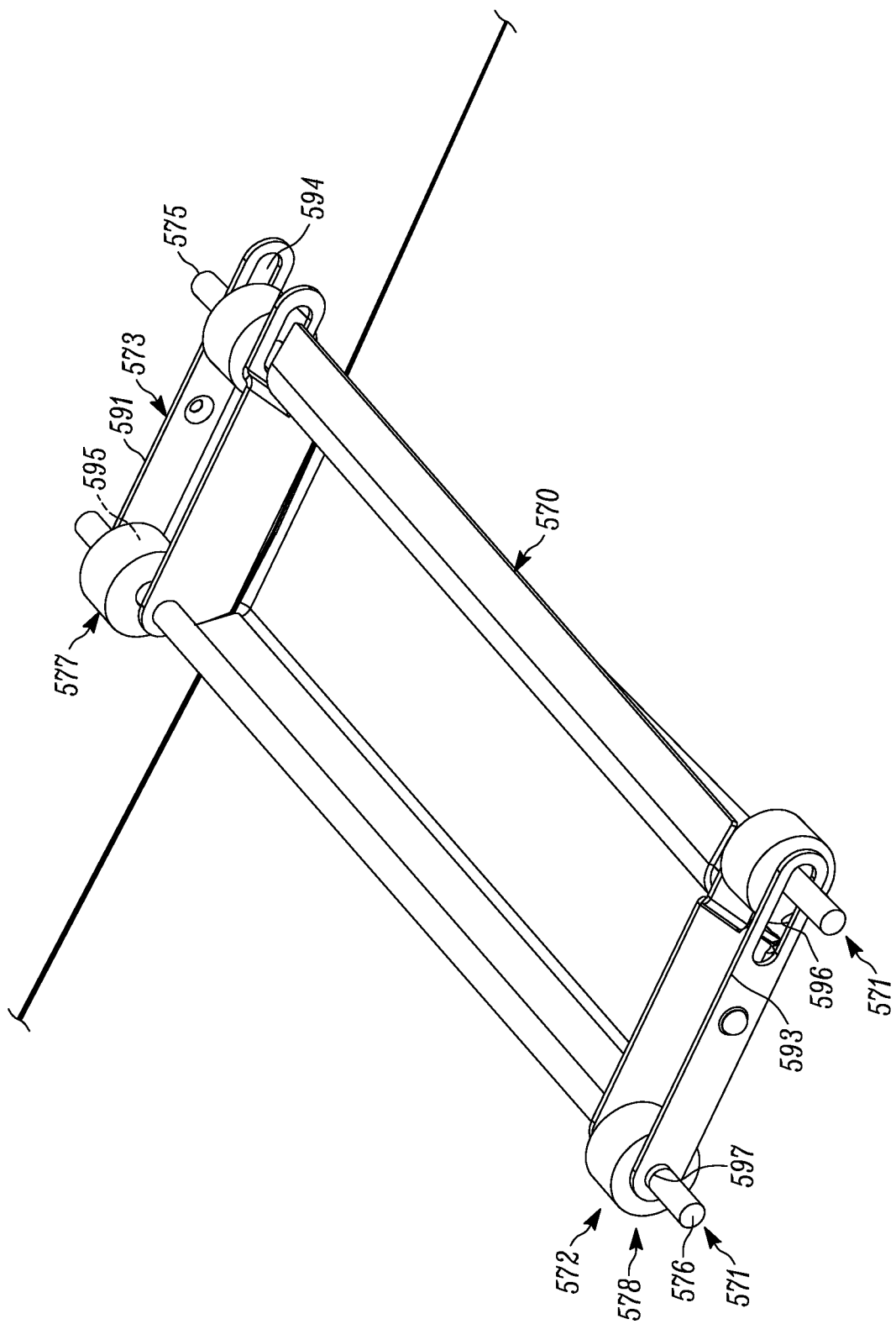
FIG. 10 of the drawings is a perspective view of a complete segment of the conveyor assembly of the present disclosure.
Figure 11:
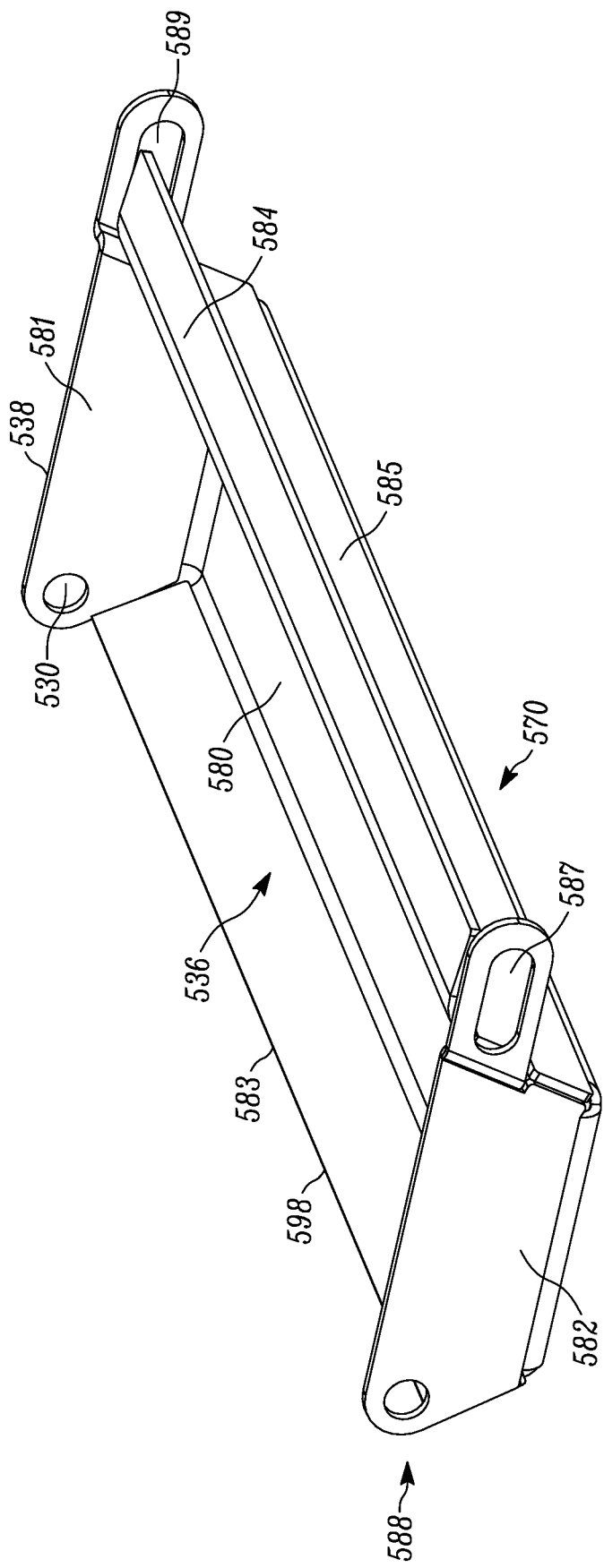
FIG. 11 of the drawings is a perspective view of the cup member of the conveyor assembly of the present disclosure.

With reference to FIGS. 9 through 11, the conveyor assembly 508 is formed from a plurality of cup members, such as cup member 570 which are coupled together in an end to end fashion through the axle members 571 and the guide links 572, and wherein the cup members are permitted to rotate about an axis defined by the axles and pivot relative to each other in in a plane that is perpendicular to that axis. In this manner, the conveyor assembly can travel in the path of the frame member, along the guide wheels 572 through the gathering portion, the outward portion and the terminating portion, and cycle back in the lower chamber. The cup members when joined form a conveyor hoop that extends through the lower chamber and upper open channel.

More particularly, the cup members include base surface 560, first side wall 581, second side wall 582, back wall 583 and front wall 585. The first side wall includes first front axle slot 587 and first rear axle opening 589. The second side wall includes second front axle slot 588 and second rear axle opening 590. The first front axle slot and the second front axle slot substantially correspond, and are coaxial. The first rear axle opening and the second rear axle opening substantially correspond. Whereas the rear axle openings are substantially circular, the rear axle slots are elongated, slots having a minor diameter that matches the axle openings.

The back wall 583 includes upper edge 598. The front wall 585 includes upper cover flange 584 which extends oblique to the back wall (and in the configuration shown, generally parallel to the base surface 560). In the configuration shown, the side walls are substantially perpendicular to the base surface and parallel to each other. The front wall and the back wall are each oblique to each other and to the base surface. The different surfaces and walls define cavity 536 with upper opening 538. With the oblique front and back walls, the upper opening 538 has a larger perimeter than the perimeter of the base surface 560. The base surface is generally rectangular, although variations are contemplated.

The axle members 571 include front axle 575 and rear axle 576, the axles have the same construction. In the configuration shown, the axle member 571 extends through the front axle openings. Similarly, the rear axle 576 extends through the rear axle slots. The combining and the coupling of the different cup members will be described below.

Guide wheels, including first side guide wheel 577 and second side guide wheel 578 are positioned outboard of the first and second side wall, respectively, at each axle member 571.

The guide links 573 comprise opposing guide links that are positioned outboard of the guide wheels and the side walls of the cup members. In particular, the guide links 573 comprise first side guide link 591 and second side guide link 593. The first side guide link 591 includes front slot 594 and rear opening 595. The openings correspond to the openings of the first and second side walls. The slots correspond to the slots of the first and second side walls.

To assemble the conveyor, a plurality of cup members 570, axle members 571, guide wheels 572 and guide links 573. The cup members are arranged in sequential order with the front wall of one cup member abutting the back wall of the adjacent cup member. Once arranged, an axle member is directed through the first front axle slot of a second cup member, the first rear opening of the first cup member, then through the second rear opening of the first cup member and finally through the second front slot of the second cup member. It will be understood that as the axle is directed through slots of the second cup member, the second cup member can pivot and slidably move relative to the first cup member as the axle can slidably move along the slots.

Next, another cup member is positioned to abut the first cup member opposite the second cup member. Once positioned, another axle member is directed through the first front axle slot of the first cup member, the first rear opening of the third cup member, then through the second rear opening of the third cup member and finally through the second front slot of the first cup member. It will be understood that each axle member comprises a front axle member for one pair of cup members and a rear axle member for another pair of cup members. This is continued for each subsequent cup member. It will be understood that eventually, when the desired length is reached, the first end and the second end of the string of cup members can be coupled together to form a hoop, or, conveyor.

A guide wheel is slid over either side of each axle member. Subsequently, a guide link is directed between pairs of front and rear axles, and along each side of the side walls of the cup member. The openings of the side walls correspond to the openings of the guide links and the slots of the side walls correspond to the slots of the guide links. This process is likewise repeated for each of the cup members along the length thereof.

As can be seen in the figures, the upper cover flange 584 of the front wall of one of the cup members overlies the upper edge of the back wall of an adjacent cup member. The flange extends outwardly a sufficient extent that the upper edge of the back wall remains covered thereby, regardless of the relative position of the adjacent cup members (that is regardless of the position of the axle member relative to the first and second axle openings). It will be understood that the upper cover flange may be positioned on either one of the front wall and the back wall.

The slots of the cup members and the guide links are sufficient to allow the cup members to navigate the frame structure through the gathering portion, the outward portion and the terminating portion, without impingement, and without binding. Additionally, the travel is limited so as to insure the overlapping of the upper cover flange and the adjacent cup member.

In operation, the cup members travel along the different portions. At the gathering portion, berries or other materials are directed into the cavities of the cup members. They are directed along the frame member through the outward portion and the terminating portion. As the cup members travel outwardly and are inclined upwardly, the ability to pivot along the axis of the axle (to facilitate inclining up and down, and to rotate about the pulleys at each end) and also to pivot due to the slots in the cup member relative to each other (side to side), the cup members can negotiate the outward portion and the terminating portion without impingement. When the terminating portion is reached, the cup members turn about the pulley, and gravity discharges the berries and other material from within the cup member onto the berry discharge surface. While on this surface, the blower blows air from below and through the berry discharge surface. The lighter material (debris and the like) is blow upwardly, while the relatively heavier berries remain on the surface, or are not directed upwardly a sufficient amount. Eventually, the berries reach the end of the discharge guide member and are directed to the berry discharge chute. The air and the lighter debris and other undesirable material is blown through the air duct and, eventually through the outlet 559. The berries in the discharge chute are directed to a container or other collection structure.

The cup members return along the reverse path, in an upside down configuration through the lower chamber to the first end of the frame structure. At the first end of the frame structure, the cup members again are rotated about a pulley, and again begin their journey along the gathering portion.

As can be seen in the Figures, the rear pullies are powered by motors, in the configuration shown, independently, as are the blowers on each side. As such, the speeds and the movement of the first side lower conveyor sub-assembly and the second side lower conveyor sub-assembly can be controlled in unison or independently, and the two may have the cup members moving at different speeds for any number of reasons.

It will be understood that other configurations of the conveyor assembly are contemplated, and the structure of the cup member is not limited to those shown. For example, the cup members may have a differently shaped cavity and may have a differently configured relative rotation structures. It has been found that the structure shown allows for the careful handling of berries and limits bruising and damage to berries, such that the berries may be suitable for fresh consumer packaging.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A shaped conveyor assembly configured for use in association with a harvester comprising:
    a first side lower conveyor sub-assembly and a second side lower conveyor subassembly that is distinct from the first side lower conveyor sub-assembly, the first side and second side lower conveyor sub-assemblies being spaced apart from each other and on opposing sides of a channel through which plants to be processed by the harvester extend, at least one of the first side and second side lower conveyor sub-assemblies including:
    a frame structure having a first end and a second end extending longitudinally along the length of the harvester, the frame structure including a gathering portion, an outward portion and a terminating portion, the gathering portion positioned proximate the first end and spaced apart from the second end, the terminating portion positioned proximate the second end and spaced apart from the first end, with the outward portion extending therebetween, the outward portion being inclined in an upward direction relative to the gathering portion, and directed in an outward direction away from the channel and thereby being spaced further away from the channel than the gathering portion, and away from the other one of the first side and the second side lower conveyor sub-assemblies;
    a discharge assembly positioned at the second end of the frame structure, the discharge assembly structurally configured to dispense into a container; and
    a conveyor assembly that extends between the first end and the second end, and along each of the gathering portion, the outward portion and the terminating portion.

2. The shaped conveyor assembly of claim 1 wherein the outward portion comprises an outwardly curved portion.

3. The shaped conveyor assembly of claim 2 wherein a portion of the terminating portion is substantially parallel to at least a portion of the gathering portion.

4. The shaped conveyor assembly of claim 2 wherein the outward portion is angled relative to the gathering portion by an angle of between 110° and 170°.

5. The shaped conveyor assembly of claim 4 wherein the outward portion is angled relative to the gathering portion by an angle of between 145° and 160°.

6. The shaped conveyor assembly of claim 2 wherein the terminating portion comprises an inwardly curved portion, wherein the curves substantially match resulting in a portion of the terminating portion being substantially parallel to at least a portion of the gathering portion.

7. The shaped conveyor assembly of claim 1 wherein the first side lower conveyor subassembly and the second side lower conveyor sub-assembly are substantial mirror images of each other taken generally about a longitudinal axis bisecting the channel.

8. The shaped conveyor assembly of claim 1 wherein the frame structure defines a lower chamber and an upper open chamber between the first end and the second end thereof, with the conveyor passing through the lower chamber in a first direction and through the upper open chamber in a second direction.

9. The shaped conveyor assembly of claim 1 wherein the conveyor assembly comprises a plurality of cup members arranged in an end to end fashion, the cup members are configured to rotate relative to each other about an axis and to pivot relative to each other about a plane perpendicular to the axis.

10. The shaped conveyor assembly of claim 9 wherein the cup members are joined to each other through a plurality of axles that extend through adjacent pairs of cup members.

11. The shaped conveyor assembly of claim 10 wherein the cup members include opposing pairs of openings and slots, with the openings corresponding to the axles, and with the slots allowing for slidable movement of the axles therealong.

12. The shaped conveyor assembly of claim 10 further comprising a plurality of guide wheel, each one of which is coupled to opposing ends of each one of the plurality of axles.

13. The shaped conveyor assembly of claim 12 further comprising a guide link extending between adjacent ones of the plurality of axles outboard each of the plurality of guide wheels.

14. The shaped conveyor assembly of claim 12 wherein the frame structure further includes an upper open channel, defined by an outer upstand wall and an inner upstand wall opposite the outer upstand wall, and an intermediate wall, and a lower chamber below the upper open channel, the outer upstand wall having an inwardly facing outer wall channel, and the inner upstand wall having an inwardly facing inner wall channel, with one of the axles and the guide wheels structurally configured to interface with the wall channels, to, in turn, facilitate placement of the conveyor relative to the frame structure.

15. The shaped conveyor assembly of claim 9 wherein each cup member further includes a base surface, a first side wall, a second side wall, a back wall and a front wall, each extending upwardly from the base surface to define a cavity with an upper opening, one of the front and back walls further including an upper cover flange extending therefrom, and structurally configured to overlie the back wall of an adjacent cup member when joined.

16. The shaped conveyor assembly of claim 14 wherein each of the first side wall and the second side wall include an axle slot and an axle opening, with the axle slots of the first side wall and the second side wall corresponding to each other, and with the first slot and the second slot corresponding to each other.

17. The shaped conveyor assembly of claim 1 wherein the discharge assembly further includes a berry discharge guide member having a plurality of openings, and a blower outlet directed to the plurality of openings to, in turn, facilitate the blowing of air through the openings.

18. The shaped conveyor assembly of claim 17 wherein a berry discharge chute extends from the berry discharge guide member.

19. The shaped conveyor assembly of claim 18 further comprising an air duct positioned above the berry discharge guide member, and including an outlet spaced apart from the berry discharge chute.

20. The shaped conveyor assembly of claim 1 wherein the gathering portion further includes a plurality of openings positioned therealong, with a cover portion selectively positionable between one of an open configuration and a closed configuration, wherein in the closed configuration, access to the openings is precluded.

21. The shaped conveyor assembly of claim 20 wherein the cover portion is hingedly coupled to the gathering portion of the frame structure.

22. The shaped conveyor assembly of claim 1 wherein the gathering portion is generally parallel to a direction of travel of the harvester.

* * * * *